Figure 1:
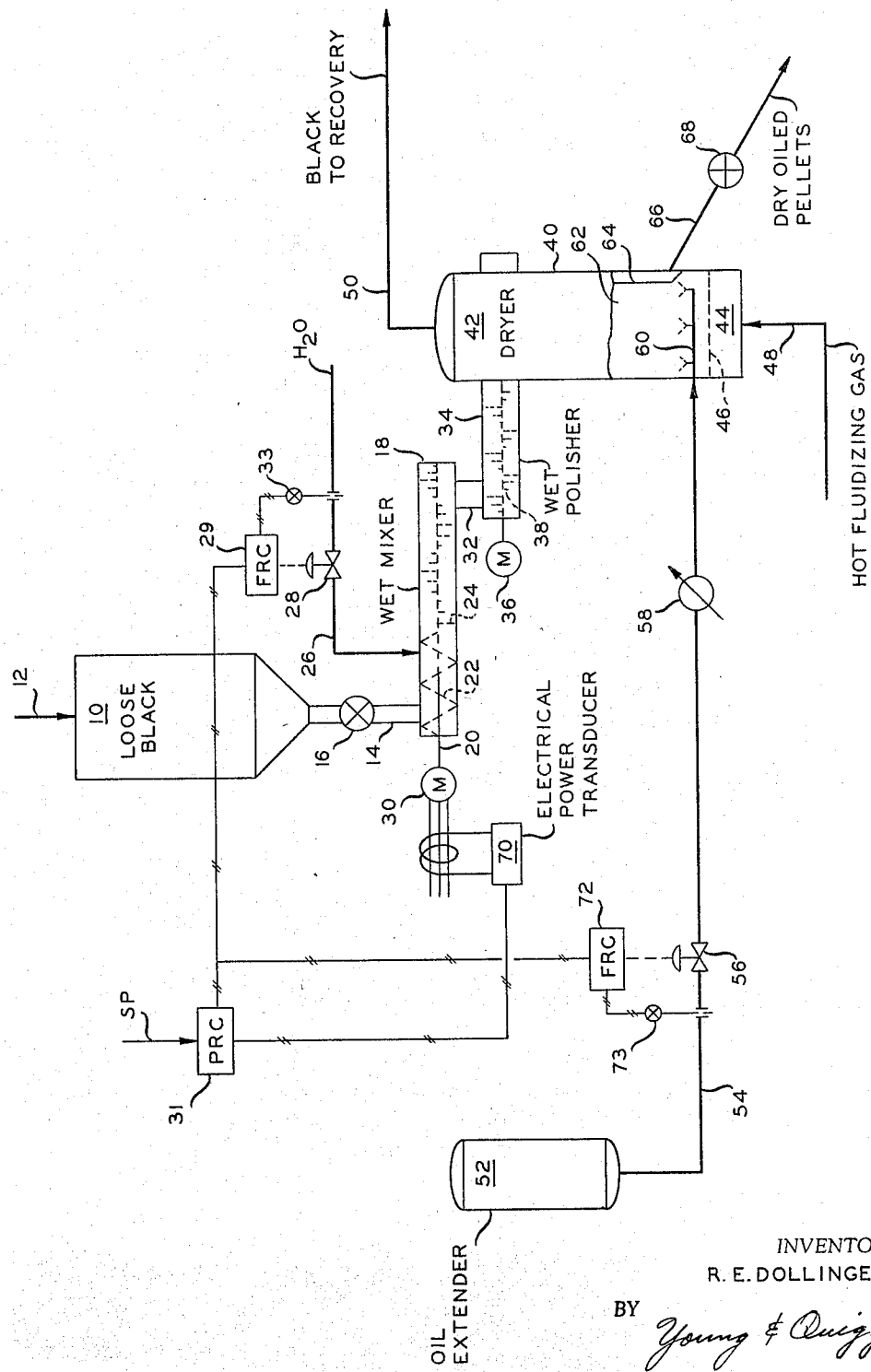

INVENTOR.
R. E. DOLLINGER
BY Young & Quigg
ATTORNEYS

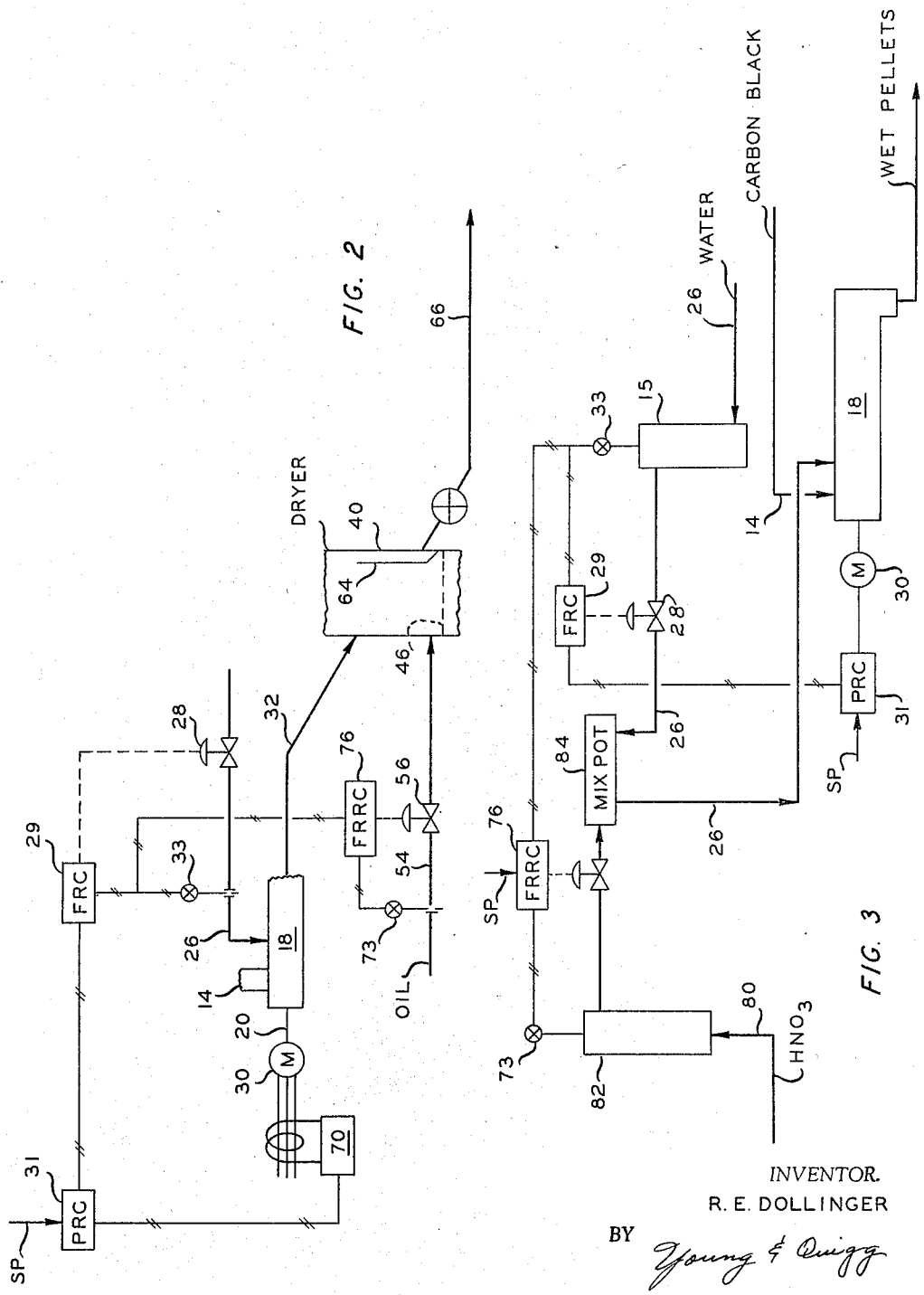

United States Patent Office 3,277,218
Patented Oct. 4, 1966

3,277,218
WET PELLETING OF CARBON BLACK
Robert E. Dollinger, Borger, Tex., assignor to Phillips Petroleum Company, a corporation of Delaware
Filed Mar. 2, 1964, Ser. No. 348,396
13 Claims. (Cl. 264—40)

This application is a continuation-in-part of application S.N. 332,082, filed December 20, 1963.

This invention relates to a process and apparatus for wet pelleting carbon black, and simultaneously adding an additional adjuvant to the black.

A convenient form for transporting and handling carbon black is small pellets ranging from about 35 mesh to 10 mesh in size. Flocculent carbon black from carbon black furnaces or reactors is collected in gas-solids separators such as a bag filter unit and the recovered black is wet pelleted with water which may contain certain additives such as molasses. Depending upon the character of the black which in turn depends upon the type of feed stream and the process by which the black is made, the flocculent black is pelleted with an amount of water in the range of 40–60 weight percent of the wet pelleted product. Most blacks are pelleted to advantage with an equal weight of water so that the resulting wet pellets contain 50 percent water and 50 percent black by weight. The effluent wet pellets from the pelleting step are passed through a dryer such as rotary drum dryer or a fluidized bed dryer where the moisture content is reduced to less than one weight percent and usually less than 0.5 weight percent.

In recent years, substantial demand has arisen for oiled carbon black pellets containing the desired amount of extender oil for direct use in a rubber-black-oil master batch. By dispersing the desired weight percent of oil in the pellets during manufacture, the incorporation of these pellets in the rubber master batch automatically incorporates the desired amount of oil in the rubber recipe. It is difficult to control the addition of oil to the pellets after they have been produced and dried. The difficulty is in incorporating a uniform amount and a uniform dispersion of oil on the pellets.

It is conventional to incorporate other adjuvants in carbon black, during or subsequent to pelleting thereof. Molasses is sometimes incorporated in amounts up to 4 or 5 percent by weight in the aqueous pelleting liquid. KCl is another agent added to carbon black.

In the U.S. patent to Jordan (2,686,107) nitric acid is incorporated in furnace carbon black during wet pelleting thereof to produce a non-scorching black. The acid is added to the furnace black by incorporating same in the pelleting water in a concentration in the range of 5 to 25 weight percent of the water and the dry black is pelleted with the acid solution in an amount in the range of 40 to 100 weight percent of the dry black.

This invention is concerned with a process and apparatus for controlling the incorporation of a plurality of agents or adjuvants in carbon black, either during or subsequent to pelleting.

Accordingly, it is an object of the invention to provide a process and apparatus for simultaneously controlling the pelleting of carbon black with aqueous liquid and incorporating therein a predetermined amount or concentration of at least one additional adjuvant or agent which enhances the carbon black. It is also an object of the invention to simultaneously control the wet pelleting of carbon black and the incorporation of a desired concentration of nitric acid therein.

It is another object of the invention to provide a process and apparatus for simultaneously drying wet carbon black pellets and incorporating a predetermined amount or concentration of extender oil in the dried pellets. Another object is to provide a process and apparatus for wet pelleting and simultaneously drying and incorporating a desired concentration of extender oil in the dried pellets. A further object is to provide a means of controlling the rate of addition of extender oil to pellets in a drying zone downstream of a wet pelleting process. Other objects of the invention will become apparent to one skilled in the art upon consideration of the accompanying disclosure.

A broad aspect of the invention comprises wet pelleting carbon black with an aqueous liquid in a mixing zone, controlling either the flow rate of liquid or carbon black (while maintaining the other substantially constant) in response to the power consumed in the mixing and pelleting step, and controlling the addition of another adjuvant or agent to the black in the mixing zone or downstream thereof in response to the power consumed, or in response to said flow rate of liquid or carbon black. The incorporation of nitric acid in the water flowing to the pelletizer downstream of the water flow control point is an illustration of the invention. The invention is applicable to the controlled flow of a stream of any suitable adjuvant into the carbon black stream at any point in the wet pelleting, drying, and treating process.

Another aspect of the invention comprises wet pelleting flocculent carbon black, passing the effluent wet pellets from the pelleting step into a fluidized bed drying zone, passing a hot drying gas upwardly through the bed of pellets so as to maintain same in a fluidized condition, and simultaneously dispersing an extender oil into the fluidized bed at a controlled rate so as to deposit the oil on the pellets. The flow rate of oil is controlled in accordance with the flow rate of black or water to the wet pelleting step. Either of these rates of flow is a reliable measure for the flow rate of carbon black to the drying zone and serves as a relatively constant value for the control of the flow rate of oil or other agent incorporated in the carbon black in the drying zone. The extender oil concentration to be incorporated in the pellets depends upon the use to which the rubber is to be put, and will normally be in the range of about 4 to 60 weight percent of the dried pellets. It is preferred to heat the oil prior to dispersion in the fluidized bed so that the sensible heat of the oil assists in the drying step or at least does not add to the heating requirements in the fluidized bed.

A more complete understanding of the invention may be had by reference to the accompanying schematic drawing of which FIGURE 1 is an arrangement of apparatus and flow illustrating one embodiment of the invention; FIGURE 2 is a fragmentary view of similar apparatus to FIGURE 1, illustrating another control arrangement for the control of the flow of oil to the dispersion zone or dryer; and FIGURE 3 is flow of an arrangement of apparatus and controls of another embodiment of the invention.

Referring to FIGURE 1 a loose black surge chamber 10 receives black through line 12 which may connect directly with a bag filter unit in a carbon black producing and recovery system. Loose black is fed through conduit 14 under the control of feeder valve 16 into a wet pelleter 18 in the form of a pug mill provided with an axial shaft 20 on which are positioned screw conveyor 22 and mixing pins 24. Water is fed to the mill through line 26 containing motor valve 28. Shaft 20 is driven by an electric motor 30 and the water and black are mixed and formed into pellets while passing through the mill to outlet 32 leading into polisher conveyor 34 driven by motor 36. Polisher 34 is provided with pins 38 similar to the pins 24 in mill 18. Polisher conveyor 34 passes the wet pellets into the upper section of fluidized bed dryer 40 which is separated into a drying compartment 42 and a gas distribution compartment 44 by perforate gas distributing plate 46. Hot drying gas from any suitable source such as a furnace is introduced to compartment 44 through line 48. Effluent gas containing water vapor from the dried pellets is vented through line 50.

Extender oil from a supply tank 52 is passed through line 54 containing motor valve 56 through heater 58 and spray header 60 into the fluidized pellet bed 62. The dried and oiled pellets egress over weir 64 into line 66 through which the flow of pellets is controlled by a suitable flow control valve 68, such as a star valve.

The method of control of flow of water and carbon black to pellet mill 18 is fully disclosed in copending application of Carl E. Alleman, S. N. 269,248, filed April 1, 1963. One method of control set forth in said application comprises sensing the power consumed by motor 30 in operating shaft 20 as by motor analyzer 70, which may be an ammeter type of instrument, and with a relatively constant flow rate of black through conduit 14, instrument 70 transmits a power-measurement signal to power recorder controller 31, wherein it is compared with a set-point representing a desired power level or value. Controller 31 produces an output signal which manipulates the set-point of water flow recorder-controller 29, which in turn operates valve 28 so as to add that amount of water thru conduit 26, as measured by the flow measuring element and transmitter 33, which will produce the consistency required within wet mixer 18 to demand the power consumption represented by the set point of controller 31. PRC 31 has a set point which places a demand flow rate on controller 29 required to maintain a constant power on motor 30. Transmitter 33 senses the flow rate in line 26 and transmits a signal to instrument 29 proportional to the flow rate in line 26.

In conjunction with this method, the flow rate of oil in line 54 is regulated by means of flow rate controller 72 which is responsive to PRC 31. In this manner any change in power requirement makes a compensating change in the motor valve 56. To illustrate, the flow of black through conduit 14 will vary from a predetermined desirable flow rate and as this rate changes, the power sensed by instrument 70 changes and makes a compensating change in the water flow rate in line 26 by operation of valve 28 through PRC 31. However, a compensating change in the flow rate of oil in line 54 is simultaneously made by manipulation of valve 56 by instrument 72 which is also responsive to the output of power recorder controller 31 and receives a flow-rate signal from transmitter 73. As an upward fluctuation in the flow rate of carbon black in conduit 14 occurs with a steady flow rate of water through line 26, the power or current fed to motor 30 decreases which indicates a need for more water to be fed through line 26; and vice versa, as the fluctuation in the flow rate of carbon black in conduit 14 is downward, the power or current used by motor 30 increases and instrument 70 senses this and emits a signal to PRC 31 which then adjusts flow controller 29 to control valve 28 so as to reduce the flow rate of water in line 26.

Because of the rheological behavior of carbon black-water mixtures the previously described system regulates the water addition rate so as to be closely related to the somewhat variable black addition rate. Therefore the set point signal from controller 31 to controller 29, as well as being related to the flow rate of water, is also related to the flow rate of black. This being true, additional use may be made of this signal as shown in its use as the set point to oil addition flow controller whereby the rate of oil addition is regulated in proportion to the carbon black addition rate as dictated by the calibrations of transmitters 33 and 73 and controllers 29 and 72, respectively.

FIGURE 2 illustrates another control arrangement for the process and apparatus of the invention. This arrangement of apparatus is similar to that of FIGURE 1 except for the use of a flow-ratio-recorder-controller 76 in lieu of flow-rate-controller 72 and arranges this instrument to be controlled by the flow-rate signal from transmitter 33 so that, as flow in line 26 varies in response to the control system, the oil flow varies proportionally by manipulation of motor valve 56. This arrangement makes flow of oil thorugh line 54 proportional to the flow of water through line 26 (which is proportional to flow of black) which in turn is varied as the rate of carbon black fed to pellet mill 18 fluctuates.

FIGURE 2 illustrates the case where a manually variable ratio of oil to carbon black is desired and a flow ratio recorder controller 76 is employed. Oil flow rate, as measured by flow element and transmitter 73, and carbon black flow rate, as determined from its proportionality to water flow rate measured by flow element and transmitter 33, are received in FRRC 76 wherein their ratio is determined by conventional ratio control techniques. A set point of desired oil-to-black ratio is applied to FRRC 76 which in turn operates valve 56 to produce the instructed oil flow rate. Thus, the rate of oil addition to the carbon black may be requested at a desired value such as a ratio of 0.2 to 1.

Thus it can be seen that the process and apparatus of the invention provides for automatic control of the flow-rate of oil to the pellet drying and oil dispersion zone substantially in accordance with the flow-rate of black thereto. It can readily be seen that the system of controls illustrated in FIGURES 2 and 3 may be applied to the feeding of a stream of any desired additive, agent, or adjuvant into a continuous stream of carbon black to which a stream of aqueous liquid (water) is fed at a controlled rate to maintain constant power on the pellet mixer. The line 54 may carry any adjuvant and may enter the stream of carbon black at any selected point as at the water inlet or points downstream thereof. The adjuvant may be liquid, gaseous, or particulate solids. A gaseous stream might comprise vaporous nitric acid while a solids stream might comprise powdered clay for incorporation in the carbon black as a filler and substitute for carbon black.

It is also disclosed in the aforesaid copending application that the flow rate of water in line 26 may be maintained substantially constant and the flow rate of carbon black in conduit 14 may be varied by manipulation of feeder valve 16 in response to the power input to motor 30 as sensed by motor analyzer 70. The apparatus and control system of the invention is equally applicable to this arrangement for controlling the flow of black and water to pellet mill 18.

A run was made utilizing the arrangement of apparatus substantially as shown in FIGURE 1 of the drawing and the flow rate of oil through line 54 was controlled so as to deposit and disperse on the pellets in bed 62 a concentration of extender oil in the range of 33–34 weight percent.

Referring to FIGURE 3 corresponding apparatus and control elements are correspondingly designated in conformity with FIGURES 1 and 2. In the arrangement and flow shown, water line 26 passes through rotameter 15 and through mixing pot 84 before connecting with the pellet mixer 18. The water flow rate through line 26 is varied through manipulation of motor valve 28 by FRC 29 in response to PRC 31 in the same manner as in the previous figures. The adjuvant added to the system is introduced through line 80 which carries concentrated nitric acid which is introduced to mixing pot 84 where it is mixed with the water feed in line 26. Mixing pot 84 is provided with mixing means (not shown) for adequately mixing the water and acid. The control on the flow of acid through line 80 is substantially the same as the control of the flow of the oil in line 54 of the previous figures. Flow through line 80 is sensed at rotameter 82 and the transmitter 73 emits a signal proportional to the flow in line 80 and this signal is transmitted to flow-ratio-controller 76 which corresponds to instrument 76 in FIGURE 2. This instrument receives a signal from transmitter 33 corresponding to that which is emitted to controller 29 and has a set point which is adjusted to provide any desired proportion of acid in the aqueous stream passing through line 26 into mixer 18. In other words, when operating in accordance with the Jordan patent, supra, the flow rate of acid is adjusted to provide a weight of acid in the range of 5 to 20 percent of the water flowing through line 26.

The system of FIGURE 3 provides for the incorporation of a substantially constant weight ratio of acid-to-carbon black by proportioning the flow rate of water to the flow rate of carbon black and also proportioning the flow rate of nitric acid to the flow rate of water. It is again apparent that the arrangement for introducing adjuvant to the system through line 80 and then through line 26 into a pellet mixer, may be utilized to introduce any desired adjuvant in any continuous stream to a regulated stream of carbon black at any selected point from the mixer to any point downstream thereof.

Certain modification of the invention will become apparent to those skilled in the art and the illustrative details disclosed are not to be construed as imposing unnecessary limitations on the invention.

I claim:
1. A process for producing oiled carbon black pellets comprising the steps of:
   (1) feeding flocculent carbon black at a substantially constant rate to a wet pellet mill having an axial shaft and radial rods thereon, and operating said shaft with an electric motor;
   (2) sensing the power consumed by the motor of step (1) and feeding water to said mill at a rate in response to the sensed power, increasing the flow rate when the sensed power falls below a predetermined value and decreasing the flow rate when the sensed power rises above said value so as to incorporate in the resulting pellets a substantially uniform concentration of water in the range of about 40 to 60 weight percent of the pellets;
   (3) passing the resulting stream of effluent wet pellets from step (2) to a fluidized bed dryer and maintaining said pellets in a fluidized bed therein by passing a hot drying gas upwardly thru said bed;
   (4) dispersing a stream of extender oil into said bed so as to oil said pellets;
   (5) controlling the flow rate of oil in step (4) in response to a measure of one of the flow rate of water of step (2) and the sensed power; and
   (6) recovering oiled pellets from step (5).

2. The process of claim 1 wherein the sensed power is used to control the rate of flow of oil in step (5).

3. The process of claim 1 wherein the rate of flow of water in step (2) is used to control the rate of flow of oil in step (5) proportional to the flow rate of water.

4. Apparatus comprising in combination:
   (1) a wet pellet mill having an axial shaft and radial rods thereon for mixing carbon black, an inlet for black, and an outlet for wet pellets;
   (2) an electric motor operatively connected to rotate the shaft of (1);
   (3) means for sensing the power consumed by said motor;
   (4) a water feed line connected with the mill of (1) having a motor valve therein;
   (5) a transmitter sensitive to the flow rate of water in the line of (4);
   (6) a flow rate controller operatively connected with the motor valve of (4) and sensitive to the means of (3) and the transmitter of (5) so as to increase the liquid concentration when the sensed power falls below a predetermined value and vice versa;
   (7) a fluidized bed dryer connected with the pellet outlet of the mill of (1) and having an outlet for dried and oiled pellets;
   (8) an oil feed line leading into the dryer of (7) having a motor valve therein and dispersing means on its inner end; and
   (9) a flow rate controller operatively connected with the motor valve of (8) and sensitive to one of said means of (3) and controller of (6) so as to feed oil at a rate proportional to one of the flow rate of water and power sensed.

5. The apparatus of claim 4 wherein the controller of (9) is sensitive to the means of (3) so as to proportion the flow of oil to the power consumed.

6. The apparatus of claim 4 wherein the controller of (9) is a ratio flow rate controller sensitive to the controller of (6) so as to proportion the flow rate of oil to the flow rate of water.

7. In a process for producing carbon black pellets comprising the steps of:
   (1) passing a relatively constantly controlled stream of flocculent carbon black into a pelletizer-mixer provided with mixing pins on a shaft rotated by a motor;
   (2) passing a stream of aqueous liquid into the pelletizer-mixer of step (1) and forming wet carbon black pellets therein;
   (3) sensing the power consumed by the motor of step (1) and controlling the flow rate of one of the streams of step (1) and step (2) in response to the sensed power, increasing the aqueous liquid concentration when power consumption decreases, and vice versa, to maintain a relatively constant power consumption;
   (4) passing the effluent stream of wet pellets from the pelletizer-mixer into a drying zone and drying same in contact with hot drying gas;
the method of incorporating an adjuvant in the carbon black comprising the steps of:
   (a) passing a stream of a selected adjuvant into the stream of carbon black downstream of the carbon black flow-control point; and
   (b) controlling the flow rate of the stream of adjuvant of step (a) in response to one of the sensed power of step (3) and the flow rate of liquid in step (2).

8. The process of claim 7 wherein the flow rate of aqueous liquid in step (2) is controlled in response to power consumption and the flow rate of the stream of adjuvant in step (b) is controlled in response to the flow rate in step (2) as a measure of power consumption.

9. The process of claim 7 wherein the flow rate of aqueous liquid in step (2) is controlled in response to power consumption, the flow rate of the stream of adjuvant in step (b) is controlled in response thereto so as to maintain a substantially constant ratio of said liquid to said adjuvant, and said stream of adjuvant is incorporated in said carbon downstream of the pelleting step.

10. Apparatus comprising in combination:
   (1) a wet pellet mill having an axial shaft and radial rods thereon for mixing carbon black, an inlet for black, and an outlet for wet pellets;
   (2) an electric motor operatively connected to rotate the shaft of (1);
   (3) means for sensing the power consumed by said motor;
   (4) a water feed line connected with the mill of (1) having a motor valve therein;
   (5) a transmitter sensitive to the flow rate of water in the line of (4);
   (6) a flow rate controller operatively connected with the motor valve of (4) and sensitive to the means of (3) and the transmitter of (5) so as to increase the water flow rate when the power falls below a predetermined value, and vice versa;
   (7) a line for passing a stream of adjuvant into the stream of carbon black downstream of the inlet for black in the mill of (1);
   (8) a motor valve in the line of (7); and
   (9) a flow-rate-ratio-controller sensitive to flow rate in the line of (7) in operative control of the valve of (8) and actuated by the transmitter of (5).

11. The apparatus of claim 10 including a mixing pot in the water line of (4) downstream of the valve therein, the line of (7) being connected with said mixing pot.

12. A process for producing carbon black pellets comprising the steps of:
  (1) passing a relatively constantly controlled stream of flocculent carbon black into a pelletizer-mixer provided with mixing pins on a shaft rotated by a motor;
  (2) passing a stream of aqueous liquid into the pelletizer-mixer of step (1) and forming wet carbon black pellets therein;
  (3) sensing the power consumed by the motor of step (1) and controlling the flow rate of liquid in step (2) in response to the sensed power, increasing the aqueous liquid concentration when the sensed power decreases, and vice versa, to maintain a relatively constant power consumption;
  (4) passing a stream of nitric acid into the liquid stream of step (2) downstream of the flow rate sensing point;
  (5) controlling the flow rate of the stream of step (4) in response to one of the flow rate of liquid in step (2) and the sensed power of step (3), the foregoing steps producing wet carbon black pellets containing nitric acid; and
  (6) drying the resulting wet pellets in a drying zone in contact with hot drying gas.

13. The process of claim 12 wherein the flow rate of liquid in step (2) is sensed and the flow rate of nitric acid is controlled in response to the sensed flow rate of liquid to provide a substantially fixed ratio of acid-to-water.

References Cited by the Examiner

UNITED STATES PATENTS

| | | | |
|---|---|---|---|
| 1,528,851 | 3/1925 | Rodling et al. | 264—117 |
| 2,699,381 | 1/1955 | King | 264—117 |
| 2,865,868 | 12/1958 | McKinley et al. | 252—467 |
| 3,195,958 | 7/1965 | Goins | 264—117 |

ROBERT F. WHITE, *Primary Examiner.*

F. S. WHISENHUNT, J. R. HALL, *Assistant Examiners.*